US011113216B2

(12) United States Patent
Hsu et al.

(10) Patent No.: US 11,113,216 B2
(45) Date of Patent: Sep. 7, 2021

(54) DISPATCHING INTERRUPTS IN A MULTI-PROCESSOR SYSTEM BASED ON POWER AND PERFORMANCE FACTORS

(71) Applicant: MediaTek Inc., Hsinchu (TW)

(72) Inventors: Chia-Hao Hsu, Hsinchu (TW); Sen-Yu Cheng, Hsinchu (TW); Yan-Ting Chen, Hsinchu (TW); Po-Kai Chi, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 0 days.

(21) Appl. No.: 16/810,031

(22) Filed: Mar. 5, 2020

(65) Prior Publication Data

US 2020/0301860 A1  Sep. 24, 2020

Related U.S. Application Data

(60) Provisional application No. 62/820,910, filed on Mar. 20, 2019.

(51) Int. Cl.
*G06F 13/24* (2006.01)
*G06F 1/3293* (2019.01)
*G06F 9/48* (2006.01)

(52) U.S. Cl.
CPC ............ *G06F 13/24* (2013.01); *G06F 1/3293* (2013.01)

(58) Field of Classification Search
CPC ............................... G06F 13/24; G06F 1/3293
See application file for complete search history.

(56) References Cited

U.S. PATENT DOCUMENTS

| | | | | |
|---|---|---|---|---|
| 9,830,187 | B1* | 11/2017 | Blaine | G06F 9/4893 |
| 2007/0198759 | A1* | 8/2007 | Agarwal | G06F 13/26 |
| | | | | 710/260 |
| 2009/0172423 | A1* | 7/2009 | Song | G06F 9/4812 |
| | | | | 713/300 |
| 2016/0048181 | A1* | 2/2016 | Rosenzweig | G06F 1/206 |
| | | | | 713/322 |
| 2016/0103480 | A1* | 4/2016 | Sanghi | G06F 9/4405 |
| | | | | 710/313 |
| 2016/0239074 | A1* | 8/2016 | Lee | G06F 1/3225 |
| 2018/0095913 | A1* | 4/2018 | Man | G06F 1/206 |
| 2018/0232330 | A1* | 8/2018 | Weissmann | G06F 9/44 |

* cited by examiner

*Primary Examiner* — Getente A Yimer
(74) *Attorney, Agent, or Firm* — Tong J. Lee

(57) ABSTRACT

A multi-processor system handles interrupts using a power and performance status of each processor and a usage scenario of each processor. The power and performance status is indicated by factors that affect power consumption and processor performance. The system identifies one of the processors for handling an interrupt based on a weighted combination of the factors. Each factor is weighted based on a usage scenario for which the interrupt was generated. The system then dispatches the interrupt to the identified one of the processors.

20 Claims, 5 Drawing Sheets

DISPATCHING INTERRUPTS IN A MULTI-PROCESSOR SYSTEM BASED ON POWER AND PERFORMANCE FACTORS

CROSS-REFERENCE TO RELATED APPLICATIONS

This application claims the benefit of U.S. Provisional Application No. 62/820,910 filed on Mar. 20, 2019, the entirety of which is incorporated by reference herein.

TECHNICAL FIELD

Embodiments of the invention relate to interrupt dispatch in a multi-processor system.

BACKGROUND

An interrupt is a signal to inform a system to take immediate action in response to certain events. When an interrupt is asserted in a multi-processor system, a processor in the system executes a corresponding interrupt service routine (ISR) to service the interrupt. An interrupt may have a response time requirement. The response time is the time interval between the arrival time of the interrupt at an interrupt controller and the completion time of the corresponding ISR. The corresponding ISR is to be completed within the required response time.

Some multi-processor systems may designate a single processor as an interrupt-handling processor to service all of the interrupts in the system. Some other multi-processor systems may designate a group of processors, or all of the processors in the system, to service interrupts. In the latter systems, each interrupt is dispatched to and handled by one of the processors. When multiple interrupts arrive at substantially the same time, these interrupts are dispatched to multiple processors. In some systems, the multiple processors may be arranged in multiple clusters.

One approach for distributing interrupts to processors is the round-robin scheme, in which each processor takes turns to service an incoming interrupt according to a predetermined round-robin order. When it is its turn to handle an interrupt, a processor may have to suspend its current task, or wake up from a low-power state, to execute the corresponding ISR. The arrival of interrupts is unpredictable, and the preemptive nature of ISR execution is highly disruptive to a processor's workflow. Thus, the selection of a processor to handle an interrupt can have a crucial impact on system optimization.

SUMMARY

In one embodiment, a system is provided for handling an interrupt. The system includes multiple processors, an interrupt controller, and interrupt-generating devices. The interrupt controller is operative to: receive a power and performance status of each processor, the power and performance status indicated by factors that affect power consumption and processor performance; and identify one of the processors for handling the interrupt based on a weighted combination of the factors. Each factor is weighted based on a usage scenario for which the interrupt was generated. The interrupt controller then dispatches the interrupt to the identified one of the processors.

In another embodiment, a method is provided for handling an interrupt in a system including multiple processors. The method comprises: receiving a power and performance status of each processor. The power and performance status is indicated by factors that affect power consumption and processor performance. The method further comprises: identifying one of the processors for handling the interrupt based on a weighted combination of the factors. Each factor is weighted based on a usage scenario for which the interrupt was generated. The method further comprises: dispatching the interrupt to the identified one of the processors.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention enable a multi-processor system to select a processor among a group of processors to dispatch an interrupt. The selection may be based on a weighted combination of factors per processor. These factors are indicative of a processor's power and performance status. The factors may include power factors and performance factors, which affect the power consumption and processor performance, respectively. The weights may be determined in view of a usage scenario for which the interrupt is generated. For example, a usage scenario may be a system executing a real-time task (e.g., a gaming application) and interrupts may be generated by a user's tapping motion on a touchscreen of the system. These interrupts may have a stringent response time requirement. In such a usage scenario, performance factors related to latency (also referred to as latency factors) may be given higher weights than power factors. In another example, an interrupt may be generated in a usage scenario where the system is in a screen-off state to save power. In such a usage scenario, the power factors may be given higher weights than the performance factors.

In some embodiments, the performance factors are given higher weights than power factors when the system is heavily loaded; e.g., when a user of the system is streaming high-quality audio or playing a fast-paced game. The power factors may be given higher weights than the performance factors when the system is lightly loaded; e.g., an interrupt may be dispatched to a powered-on processor instead of waking up an idle processor. It is understood that the terms "heavily loaded" and "lightly loaded" may be defined according to a commonly-accepted metric; e.g., the amount of processor resource utilization.

It should be noted that the "multi-processor system" described herein may be arranged and managed as one or more clusters. A multi-processor system may also be referred to as a multicore system, a multicore processor system, or a combination of both. A "processor" as used herein may be a core, a processor core, a central processing unit (CPU), or a processing element of any kind capable of serving interrupts. A "cluster" as used herein may be a group of cores, processors, CPUs, or processing elements of any kind capable of serving interrupts.

Figure 1:
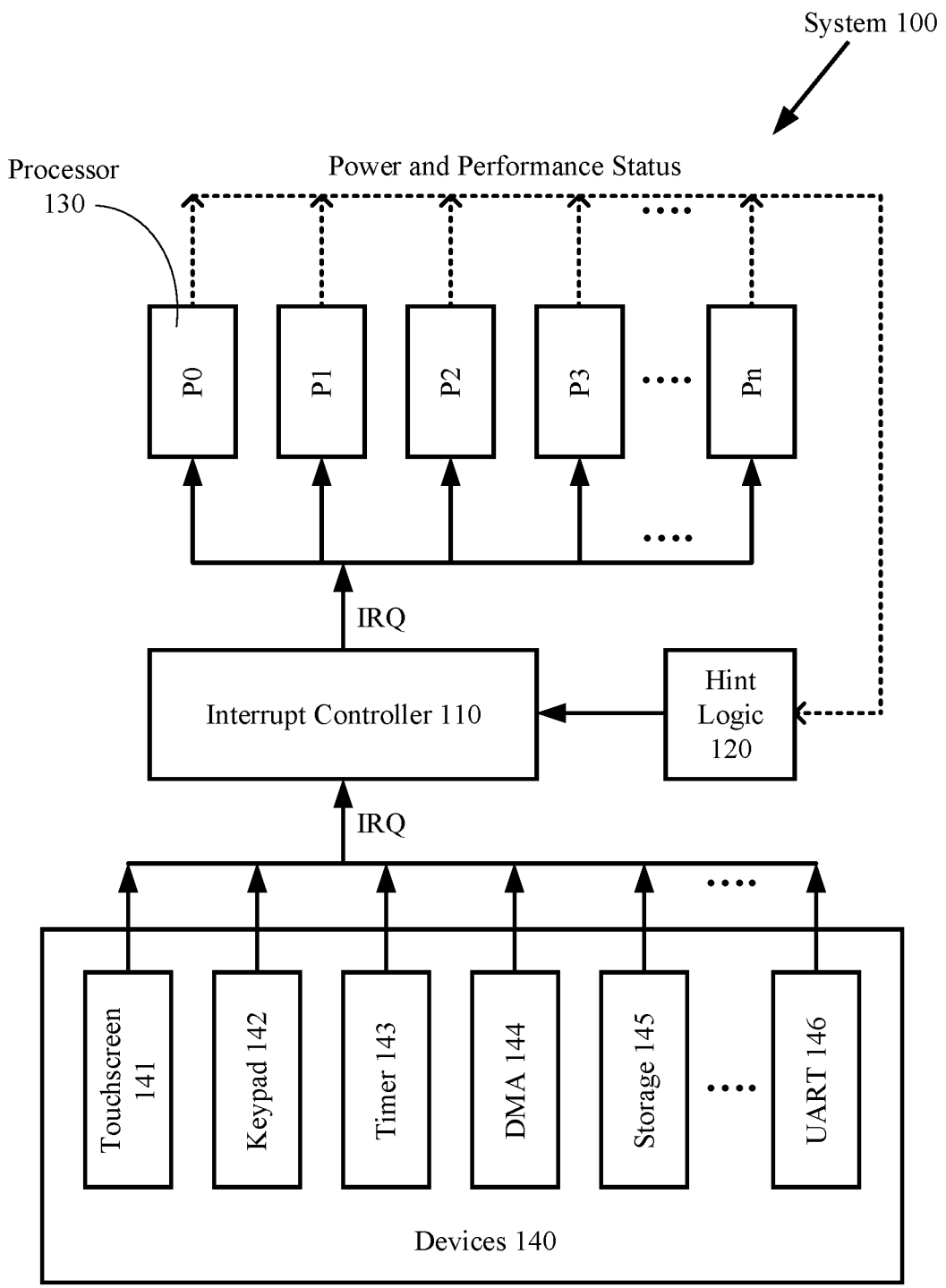
FIG. 1 illustrates a multi-processor system according to one embodiment.

FIG. 1 is a block diagram illustrating a multi-processor system 100 according to one embodiment. In this embodiment, the multi-processor system 100 (hereinafter referred to as the system 100) includes an interrupt controller 110 coupled to processors P0-Pn (collectively referred to as processors 130) and devices 140 in the system 100. The devices 140 may include, but are not limited to, one or more of a touchscreen 141, a keypad 142, a timer 143, a direct memory access (DMA) device 144, a storage device 145, a universal asynchronous receiver-transmitter (UART) 146, and the like. In alternative embodiments, the system 100 may include more, fewer, or different devices than what is shown in FIG. 1. Each of the devices 140 can generate interrupts by sending interrupt requests (IRQs) to the interrupt controller 110. For simplicity of illustration, additional components in the system 100 are omitted.

When the interrupt controller 110 receives an IRQ, it forwards the IRQ to one of the processors 130. The processor that receives the IRQ performs an interrupt service routine (ISR) according to the received IRQ. In one embodiment, the interrupt controller 110 identifies a processor to dispatch the IRQ based on the information from a hint logic 120. The hint logic 120 gathers information regarding per-processor power and performance status. The information indicates whether a given processor is to be chosen for handling an incoming interrupt. However, the choice of the processor may be different depending on whether power consumption outweighs latency or vice versa. Whether power consumption outweighs latency, or vice versa, may depend on the usage scenario of the system 100. In one embodiment, the hint logic 120 also identifies the usage scenario of the system 100, and provides the per-processor power and performance status and the usage scenario to the interrupt controller 110. Based on the usage scenario, the interrupt controller 100 weights factors corresponding to the power and performance status of each of the processors 130 to identify a processor for handling the interrupt. Details about the factors will be provided in the descriptions below with reference to FIGS. 3-5.

In one embodiment, the hint logic 120 may be implemented by hardware. In another embodiment, the hint logic 120 may be implemented by software executed by circuitry in one or more of the processors 130 or the interrupt controller 110. In yet another embodiment, the hint logic 120 may be a combination of hardware and software. In one embodiment, the hint logic 120 may be part of the interrupt controller 110. The dotted lines in FIG. 1 indicate the flow of the power and performance status information from the processors 130 to the hint logic 120. Depending on the implementation, these dotted lines may or may not correspond to physical connections (e.g., wires).

Figure 2:
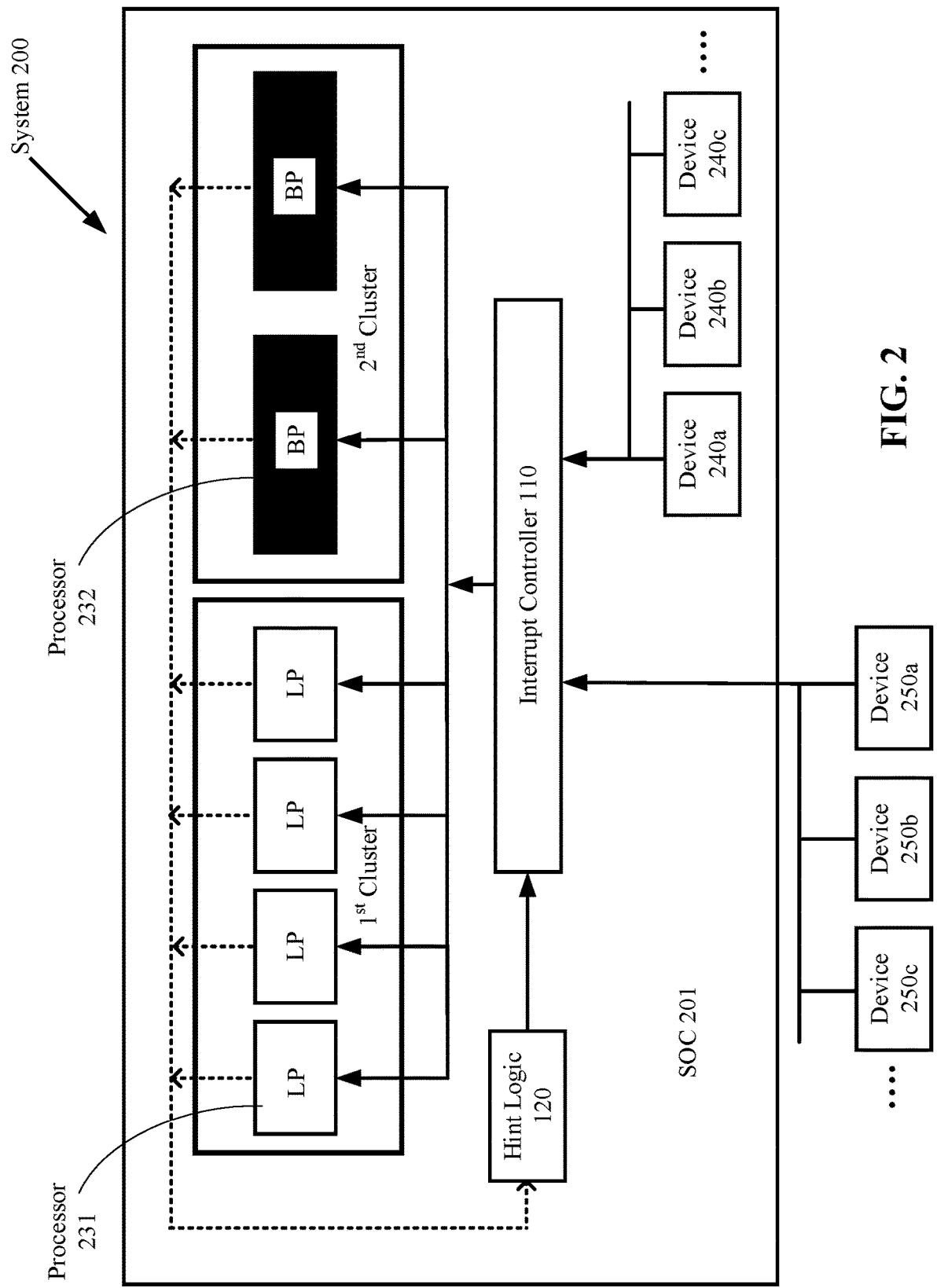
FIG. 2 illustrates a multi-cluster system including multiple processors according to one embodiment.

FIG. 2 illustrates an example of a multi-cluster system 200 according to one embodiment. In FIG. 2, the multiple processors are arranged in multiple clusters. Although two clusters are shown, it is understood that the multi-cluster system 200 (hereinafter referred to as the system 200) may include any number of clusters, and each cluster may include any number of processors. The system 200 may be an example of the system 100 in FIG. 1.

In this embodiment, the system 200 includes a first cluster of processors 231 and a second cluster of processors 232. The processors 231 and the processors 232 may have different power and performance characteristics. For example, each processor 231 may be a high-efficiency (labeled as "LP") and each processor 232 may be a high-performance processor (labeled as "BP"). To be more specific, LP's lower power consumption, lower performance and flatter growth curve of power vs. performance are relative to BP's higher power consumption, higher performance and steeper growth curve of power vs. performance when both processors operate at the same operating frequency. In an alternative embodiment, the system 200 may include one or more clusters, and each cluster contains a combination of different processors (e.g., a combination of LPs and BPs).

Similar to the system 100 in FIG. 1, the system 200 includes the interrupt controller 110 and the hint logic 120. The interrupt controller 110 is coupled to each LP and each BP. Similar to the system 100 in FIG. 1, the interrupt controller 110 receives an indication of power and performance status of each processor from the hint logic 120. In one embodiment, the processors 231 and 232, the interrupt controller 110, the hint logic 120 and multiple interrupt-generating devices 240a, 240b and 240c are part of a system-on-a-chip (SOC) 201. The devices 240a, 240b and 240c may collectively be referred to as the devices 240. It is understood that the SOC 201 may include any number of interrupt-generating devices 240 coupled to the interrupt controller 110. The interrupt controller 110 may also be coupled to multiple off-chip interrupt-generating devices 250a, 250b and 250c, collectively referred to as the devices 250. It is understood that the system 200 may include any number of interrupt-generating devices 250. Examples of the devices 240 may include, but are not limited to, graphic processors, signal processors, timers, etc. Examples of the devices 250 may include, but are not limited to, system memory, I/O devices, etc. The devices 240 and 250 generate and send IRQs to the interrupt controller 110. The interrupt controller 110 is configured to forward the IRQs to selected ones of the processors 231 and 232. For simplicity of illustration, additional components in the system 200 are omitted.

Figure 3A:
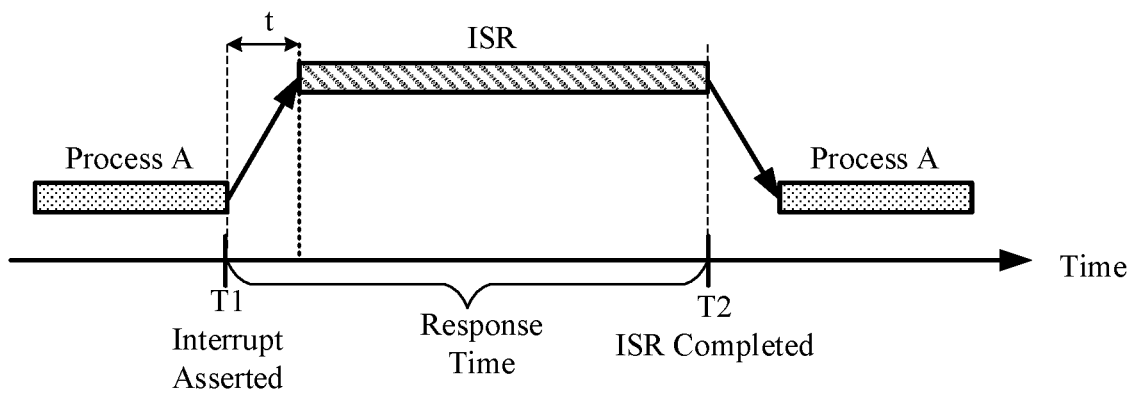
FIG. 3A and FIG. 3B illustrate examples of response time for interrupts according to some embodiments.

One main performance indicator of a processor with respect to interrupt handling is latency. Latency measures a processor's response time to an interrupt. FIG. 3A illustrates an example of response time according to one embodiment. When a device asserts an interrupt (i.e., generates an IRQ), the interrupt controller 110 dispatches the IRQ to one of the processors; e.g., P1. In response to the IRQ, P1 suspends its current task if it is in the middle of executing a process (e.g., Process A), or wakes up if it is in a low-power state, to execute the corresponding interrupt service routine (ISR). The time interval from (T1) when P1 receives the IRQ to (T2) when the ISR is completed is P1's response time to the interrupt. To the source of the interrupt (i.e., the device generating the interrupt), this response time is a measure of latency of the system. After the ISR is completed, P1 may return to its previous task (e.g., Processor A) or the low-power state.

It is noted that the response time includes the ISR execution time and a transition time (t), where the transition time (t) is the time it takes for P1 to start the ISR execution after it receives the IRQ. For example, P1 may spend the transition time to wake up from a low-power state, to store its current context, to finish another ISR, etc. In another example, P1 may be interrupt-disabled when it receives the IRQ. When an interrupt (i.e., the IRQ) is dispatched to an interrupt-disabled processor, the interrupt will be held in a pending state until the processor becomes interrupt-enabled. Thus, the time an interrupt waits in the pending state adds to the response time. A processor is interrupt-disabled when it is in an interrupt context; e.g., in spinlock_irqsave context, in dislable_interrupt context, in an ISR, etc. The status of a processor being interrupt enabled is an indication that the processor is able to immediately service an interrupt to be dispatched.

The performance factors used for selecting an interrupt-handling processor may include those factors (also referred to as latency factors) that affect the response time. The example of FIG. 3A shows that the performance factors may include whether a processor is interrupt-enabled.

Figure 3B:
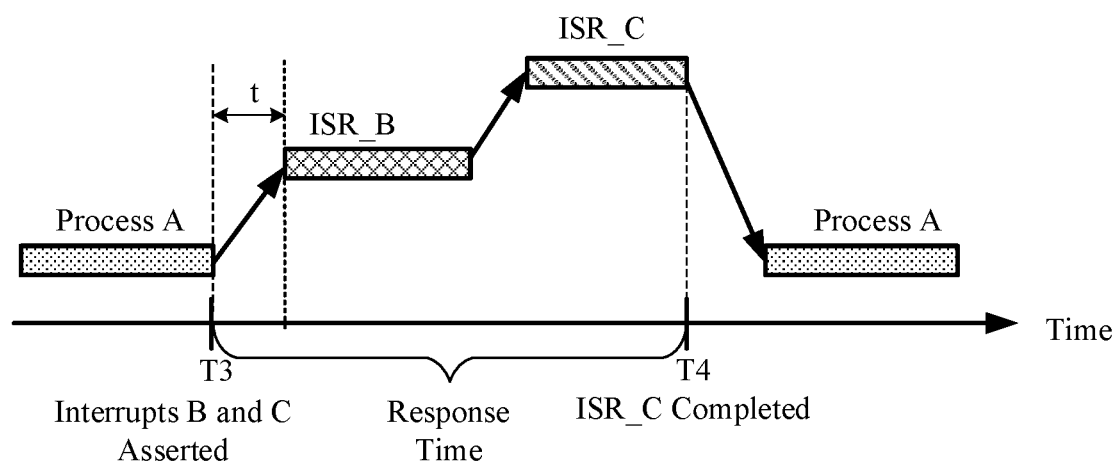

FIG. 3B illustrates another example of response time according to another embodiment. In this example, processor P1 has one pending interrupt (IRQ_B) in the queue when a second interrupt (IRQ_C) is dispatched to P1. IRQ_C has to wait in the queue until ISR_B (which is the ISR for IRQ_B) is completed. The time interval from (T3) when P1 receives IRQ_C to (T4) when ISR_C (which is the ISR for IRQ_C) is completed is P1's response time to the IRQ_C. This response time includes the transition time (t), the time IRQ_C spent waiting in the queue for the execution of ISR_B, and the execution time of ISR_C. Moreover, if the system configures interrupts into multiple priority levels, a low-priority interrupt has to wait until the processor completes higher-priority interrupts. The example of FIG. 3B shows that the performance factors may include, for each processor, the interrupt pending count and/or the number of pending interrupts having higher priorities than the interrupt to be dispatched.

Another performance factor is the processing speed of a processor. The response time in the examples of FIGS. 3A and 3B may be reduced by speed up the ISR execution. For example, a BP (the processor 232 in FIG. 2) may execute the same ISR in less time than an LP (the processor 231 in FIG. 2). Thus, the performance factors may further include the processing speed of each processor.

Furthermore, the performance factors may concern the tasks executed by each processor when an interrupt is to be dispatched. If a processor is executing a task that has a hard deadline, requires a large amount of CPU resource, is compute-bound instead of I/O bound, selecting the processor may cause the system performance to degrade with respect to these tasks. Thus, the performance factors may further include, for each processor, the CPU resource utilization of the processor, a measurement of demand imposed by current tasks on computing resources of the processor, the presence of a hard deadline imposed by current tasks on the processor.

As mentioned above, some usage scenarios may have stringent requirements on the response time, but some other usage scenarios may be lax with respect to the response time. For these other usage scenarios, the consideration of power saving may outweigh that of performance. A number of power factors corresponding to each processer's power status may be used for selecting a processor to service an interrupt. Some of the factors to be described below may be used either as performance factors or power factors.

According to some embodiments of multi-processor systems (e.g., the system 100 in FIG. 1 and the system 200 in FIG. 2), a processor may be in a power-on or power-off state. When a processor is powered off, all of the processor's states are lost. A cluster may enter the power-off state (i.e., the cluster is powered off) when all of the processors in the cluster are powered off. A cluster is in the power-on state when one or more processors in the cluster are powered on. For the purpose of power management, a processor may be in one of the predefined power modes, each indicating a level of idleness of the processor. For example, the "run" mode indicates that all components in the processor are clocked and all functionalities of the processor are available. A processor in the run mode is an active processor. In the "standby" mode, the processor is powered on but most of the clocks in the processors are disabled. Wakeup logic is still active. In the "retention" mode (which may be a subclass of the standby mode), the random access memory (RAM) devices in the processor are in retention but most or all of the processor clocks are disabled. Wakeup logic is still active. In the "shutdown" mode, the processor is powered off and all processor's states are lost. It is understood that different processors may have predefined power modes different from the aforementioned power modes.

That power on/off state of a processor and a cluster may be used as a factor in the determination of interrupt dispatch. For example, system power consumption is less when dispatching an interrupt to a powered-on processor or cluster than to a powered-off processor or cluster.

The power mode of a processor may also be used as a factor in the determination of interrupt dispatch. The power mode may be used as an indication of the idleness of each processor. With respect to latency, a processor in the retention mode can respond to an interrupt faster than in the shutdown mode, as the retention mode processor retains all its states in the RAM. With respect to power, system power consumption is less when dispatching an interrupt to an active processor (e.g., in the run mode) than to an inactive processor (e.g., in the standby mode), as the latter processor consumes power to wake up.

Furthermore, the power factors may include the power consumption of each processor and/or energy efficiency (also referred to as power efficiency) of each processor. For example, an LP (the processor 231 in FIG. 2) may be chosen over a BP (the processor 232 in FIG. 2) to execute an incoming ISR to reduce power consumption.

With respect to energy efficiency, Dynamic Voltage and Frequency Scaling (DVFS) is a power management mechanism that enables a system or a subsystem to dynamically modify its operating frequency according to the load to reduce power consumption. DFVS alters the voltage supply level and the frequency of clock signals that are provided to a circuit.

Figures 4, 5:
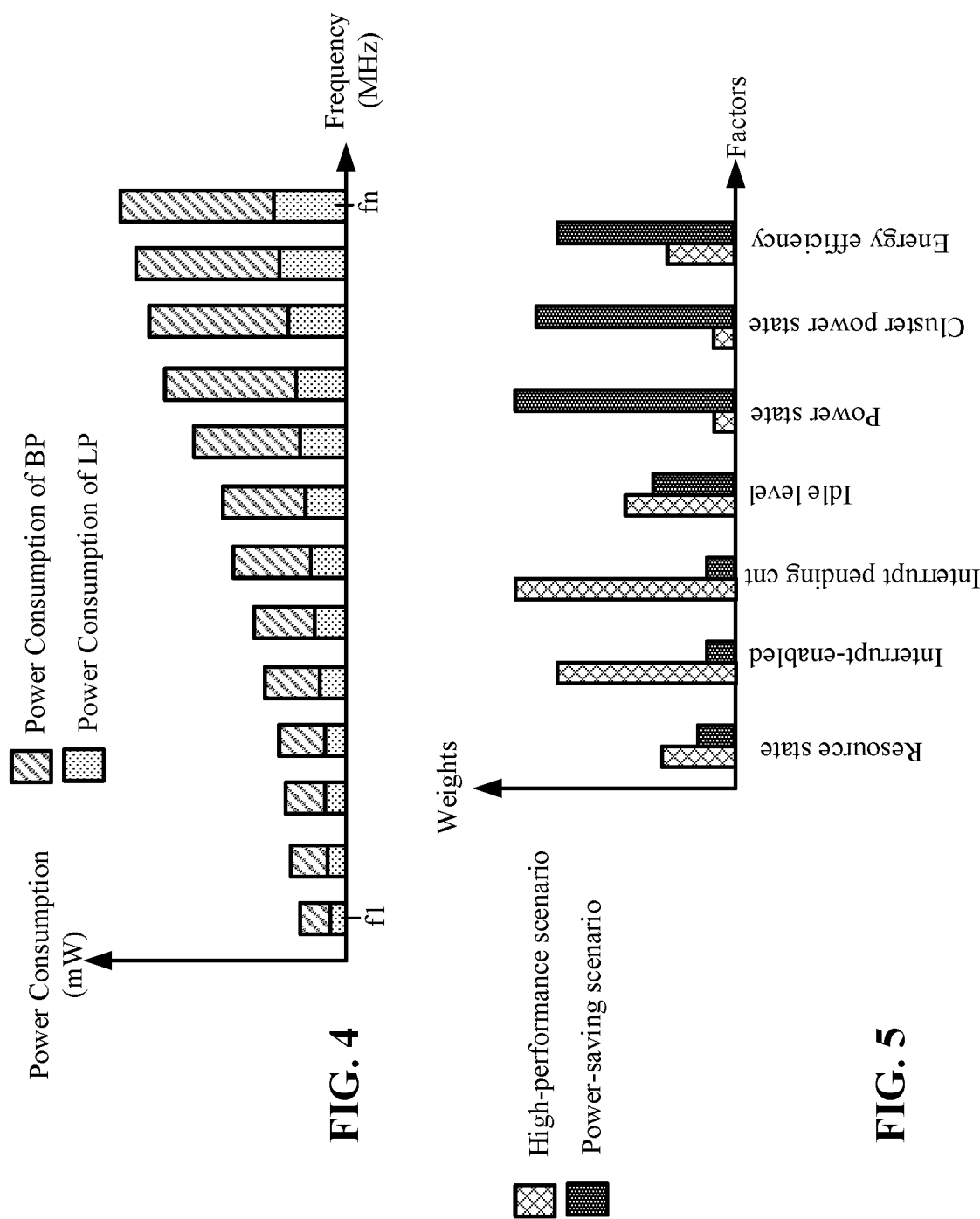
FIG. 4 is an energy efficiency diagram of two different processors according to one embodiment.
FIG. 5 is a diagram illustrating examples of weighted factors according to some embodiments.

FIG. 4 is an energy efficiency diagram of two different processors (e.g., a BP and an LP in FIG. 2) according to one embodiment. The energy efficiency diagram shows the power consumption of a BP and an LP in the vertical axis, and their respective operating frequencies in the horizontal axis. The diagram shows that the power consumption of both the BP and the LP increases when the operating frequency increases. The power consumption increase is nonlinear with respect to frequency; thus, the energy efficiency of each processor decreases when operating at higher frequencies. Although a BP typically consumes more power than an LP, a BP operating at a lower frequency (e.g., f1) may consume less power than an LP operating at a higher frequency (e.g., fn), and the BP is therefore more energy efficient in this case. In one embodiment, the power factor takes into account the energy efficiency of each processor, such as the power consumption at a present operating frequency of each processor. In one embodiment, the hint logic 120 in FIG. 1 and FIG. 2 may store a per-processor DVFS power consumption table with respect to DVFS operating frequency steps to aid the decision of the interrupt controller 110 in selecting a processor for handling an incoming interrupt.

FIG. 5 is a diagram illustrating examples of weighted factors in two different usage scenarios according to some embodiments. The first usage scenario is referred to as a "high performance" scenario, in which the performance of the processor handling the interrupt dominates power consumption of the processor and the system. Thus, in the first usage scenario, the system assigns higher weights to factors that contribute to low latency. Examples of these factors include, but are not limited to: per-processor resource state (e.g., CPU utilization state), per-processor interrupt-enabled state, per-processor interrupt pending count, and per-processor idle level. The second usage scenario is referred to as a "power saving" scenario, in which power consumption of the processor and the system dominates the performance of the processor (more specifically, the latency in the response time). Thus, in the second usage scenario, the system assigns higher weights to factors that contribute to low power and/or power-efficient operations. Examples of these factors include, but are not limited to: per-processor power state, per-cluster power state, and per-processor energy efficiency state. In one power-saving usage scenario, an interrupt may be dispatched to an active processor even though the processor is interrupt-disabled. In another power-saving usage scenario, an interrupt may be dispatched to an LP even when the LP has pending interrupts. On the other hand, in a high-performance scenario, an interrupt may be dispatched to a BP that can immediately service the interrupt even though the BP consumes more power than an LP. Thus, there is a trade-off among the power factors and the performance factors, and the factors that are given higher weights may depend on the usage scenario of the system. In one embodiment, the interrupt controller 110 uses a weighted combination of the power factors and performance factors in selecting a processor for handling an incoming interrupt.

Figure 6:
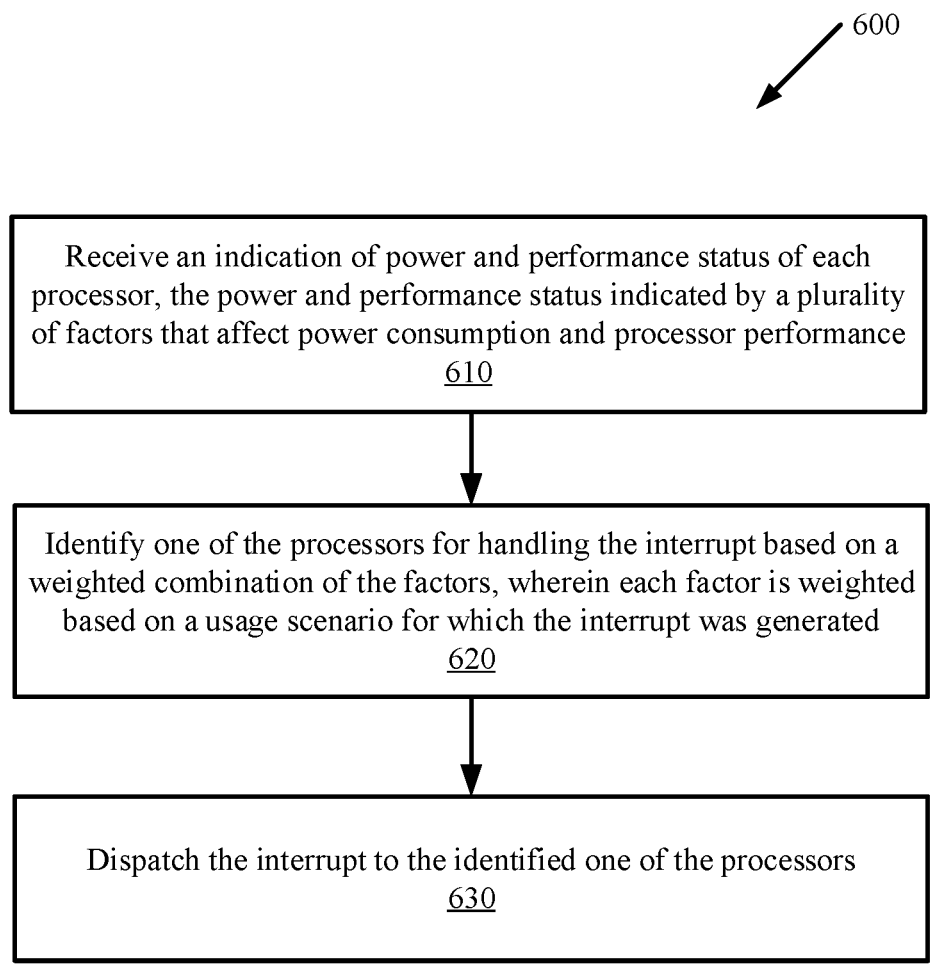
FIG. 6 is a flow diagram illustrating a method for handling interrupts in a multi-processor system according to one embodiment.

FIG. 6 is a flow diagram illustrating a method 600 for handling interrupts in a multi-processor system (e.g., the system 100 in FIG. 1 and/or the system 200 in FIG. 2) according to one embodiment. The multi-processor system includes multiple processors. The method 600 begins at step 610 when the system receives a power and performance status of each processor. The power and performance status is indicated by factors that affect power consumption and processor performance. The system at step 620 identifies one of the processors for handling the interrupt based on a weighted combination of the factors. The factors are weighted based on a usage scenario for which the interrupt was generated. The system at step 630 dispatches the interrupt to the identified one of the processors.

The method 600 may be performed by hardware (e.g., circuitry, dedicated logic, programmable logic, microcode, etc.), or a combination of hardware and software (e.g., instructions run on a processing device). In one embodiment, the system performing the method 600 may be part of a mobile computing and/or communication device (e.g., a smartphone, a tablet, laptop, etc.). In one embodiment, the system may be part of a server system or a cloud computing system.

The operations of the flow diagram of FIG. 6 have been described with reference to the exemplary embodiments of FIGS. 1 and 2. However, it should be understood that the operations of the flow diagram of FIG. 6 can be performed by embodiments of the invention other than those discussed with reference to FIGS. 1 and 2, and the embodiments discussed with reference to FIGS. 1 and 2 can perform operations different than those discussed with reference to the flow diagram. While the flow diagram of FIG. 6 shows a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A system for handling interrupts, comprising:
    a plurality of processors;
    an interrupt controller; and
    a plurality of interrupt-generating devices, wherein the interrupt controller is operative to:
        receive a power and performance status of each processor, the power and performance status indicated by a plurality of factors that affect power consumption and processor performance;
        receive a request for an interrupt from one of the interrupt-generating devices, the interrupt being generated in a usage scenario of the system;
        calculate a weighted combination of the factors for each processor, wherein each factor is weighted based on the usage scenario;
        identify one of the processors for handling the interrupt based on the weighted combination calculated for each processor; and
    dispatch the interrupt to the identified one of the processors.

2. The system of claim 1, wherein the factors for each processor include a measurement of demand imposed by current tasks on computing resources of the processor.

3. The system of claim 1, wherein the factors for each processor include a presence of a hard deadline imposed by current tasks on the processor.

4. The system of claim 1, wherein the factors for each processor include whether the processor is enabled to receive interrupts.

5. The system of claim 1, wherein the factors for each processor include a pending interrupt count of the processor.

6. The system of claim 1, wherein the factors for each processor include a power on/off state of the processor and a power on/off state of a cluster containing the processor.

7. The system of claim 1, wherein the factors for each processor include a power mode indicating an idle level of the processor.

8. The system of claim 1, wherein the factors for each processor include a state of energy efficiency of the processor with respect to an operating frequency of the processor.

9. The system of claim 1, wherein the interrupt controller is further operative to:
in response to the usage scenario for which latency in response time of the interrupt dominates power consumption, assign higher weights to the factors that correspond to higher performance of the processor.

10. The system of claim 1, wherein the interrupt controller is further operative to:
in response to the usage scenario for which power consumption dominates latency in response time of the interrupt, assign higher weights to the factors that correspond to lower power consumption of the processor.

11. A method for handling an interrupt in a system including a plurality of processors, comprising:
receiving a power and performance status of each processor, the power and performance status indicated by a plurality of factors that affect power consumption and processor performance;
receiving a request for an interrupt from one of the interrupt-generating devices, the interrupt being generated in a usage scenario of the system;
calculating a weighted combination of the factors for each processor, wherein each factor is weighted based on the usage scenario;
identifying one of the processors for handling the interrupt based on the weighted combination of the factors; and
dispatching the interrupt to the identified one of the processors.

12. The method of claim 11, wherein the factors for each processor include a measurement of demand imposed by current tasks on computing resources of the processor.

13. The method of claim 11, wherein the factors for each processor include a presence of a hard deadline imposed by current tasks on the processor.

14. The method of claim 11, wherein the factors for each processor include whether the processor is enabled to receive interrupts.

15. The method of claim 11, wherein the factors for each processor include a pending interrupt count of the processor.

16. The method of claim 11, wherein the factors for each processor include a power on/off state of the processor and a power on/off state of a cluster containing the processor.

17. The method of claim 11, wherein the factors for each processor include a power mode indicating an idle level of the processor.

18. The method of claim 11, wherein the factors for each processor include a state of energy efficiency of the processor with respect to an operating frequency of the processor.

19. The method of claim 11, further comprising:
identifying the usage scenario as a process for which latency in response time of the interrupt dominates power consumption; and
assigning higher weights to the factors that correspond to higher performance of the processor.

20. The method of claim 11, further comprising:
identifying the usage scenario as a process for which power consumption dominates latency in response time of the interrupt; and
assigning higher weights to the factors that correspond to lower power consumption of the processor.

* * * * *